(12) United States Patent
Uchikawa

(10) Patent No.: US 10,979,388 B2
(45) Date of Patent: Apr. 13, 2021

(54) COMMUNICATION APPARATUS AND METHOD FOR CONTROLLING THE SAME

(71) Applicant: CANON KABUSHIKI KAISHA, Tokyo (JP)

(72) Inventor: Shinichi Uchikawa, Matsudo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/825,590

(22) Filed: Mar. 20, 2020

(65) Prior Publication Data

US 2020/0314061 A1 Oct. 1, 2020

(30) Foreign Application Priority Data

Mar. 29, 2019 (JP) .............................. JP2019-068841

(51) Int. Cl.
*H04L 29/12* (2006.01)

(52) U.S. Cl.
CPC .......... *H04L 61/30* (2013.01); *H04L 61/2046* (2013.01)

(58) Field of Classification Search
CPC . H04L 67/30; H04L 67/2046; H04L 61/2007; H04L 61/1511
See application file for complete search history.

(56) References Cited

U.S. PATENT DOCUMENTS

| 9,065,526 | B2* | 6/2015 | Murakami | ............. | H04B 7/155 |
| 9,414,248 | B2* | 8/2016 | Kovvali | ................ | H04W 24/04 |
| 10,594,728 | B2* | 3/2020 | Kuznetsov | ............. | G06F 21/55 |
| 2004/0095962 | A1* | 5/2004 | Ohta | ................... | H04L 61/1511 370/475 |

FOREIGN PATENT DOCUMENTS

| JP | 2004-297494 A | 10/2004 |
| JP | 2010-193015 A | 9/2010 |

\* cited by examiner

*Primary Examiner* — Todd L Barker
(74) *Attorney, Agent, or Firm* — Canon U.S.A., Inc. I.P. Division

(57) ABSTRACT

A communication apparatus for transmitting data to an external device. The communication apparatus operates as a first domain name system (DNS) client to query a first DNS server accessible via a first interface to perform name resolution. The communication apparatus operates as a relay server and operates as a communication application to transmit data to a destination identified by a host name. The relay server includes a second DNS client to query a second DNS server accessible via a second interface. The communication application (i) requests the first DNS client to resolve the host name when transmitting the data to the identified destination via the first interface, and (ii) transmits the data to the relay server when transmitting the data to the identified destination via the second interface. The relay server performs name resolution for the destination identified by the host name by using the second DNS client.

7 Claims, 13 Drawing Sheets

COMMUNICATION APPARATUS AND METHOD FOR CONTROLLING THE SAME

BACKGROUND

Field

The present disclosure relates to a communication apparatus for transmitting data to an external device.

Description of the Related Art

With the recent increased complexity of security and functionality required for networks, configurations have become widespread in which a plurality of local area networks (LANs) are used in a location such as an office or a commercial facility.

These networks are separate from each other, and domain names are managed independently in each of the networks. A communication apparatus used in such a network environment, such as a multifunction peripheral (MFP), is required to support a plurality of networks.

In the related art, to resolve domain names that are independently managed in a plurality of networks, there is known a method for configuring a domain name system (DNS) cache server between a client terminal and networks in which domain names are managed independently. Configuring a DNS cache server that is capable of connecting to a plurality of networks allows the client terminal to implement name resolution for the plurality of networks, regardless of the networks (Japanese Patent Laid-Open No. 2004-297494).

There has also been proposed a technique for efficient resolution of domain names in an environment where a client communication terminal is connected to a plurality of networks in which domain names are managed (Japanese Patent Laid-Open No. 2010-193015).

Japanese Patent Laid-Open No. 2004-297494 describes name resolution performed by a plurality of DNS servers by providing a DNS cache server and sending queries from the DNS cache server to the plurality of DNS servers.

However, it is impractical to provide a DNS cache server between a client terminal and networks in an environment where domain names are managed independently in each of the networks to separate the networks from each other. In this configuration, therefore, name resolution for networks is not feasible.

Japanese Patent Laid-Open No. 2010-193015 describes a communication apparatus including a plurality of network interfaces, one of which is connected to a wide area network while the other network interface is connected to a closed area network. Further, the communication apparatus manages, for each network interface, DNS servers to be used for name resolution. The communication apparatus attempts to query a DNS server on the wide area network, determines the wide area network if an Internet Protocol (IP) address is successfully obtained, determines the closed area network if an IP address is not successfully obtained, and stores the determination result in a network list. The network list is used to implement name resolution. However, a specific mechanism by which different DNS servers are used at a LAN interface is not disclosed.

A known example of a method for implementing name resolution via a typical LAN interface is Linux (registered trademark) system specifications. For example, to resolve a domain name in the Linux system, the description of a DNS server is contained in a predetermined file to specify the DNS server. Specifically, a description, such as "name server 'IP address of a DNS server'", is contained in a file at "/etc/resolv.conf" to specify a DNS server to be used. A plurality of DNS servers may be designated for redundancy. In this case, similar descriptions, the number of which is equal to the number of DNS servers, are contained in the "conf" file.

However, each DNS server designated here is a DNS server for redundancy, which is used as an alternative to a registered DNS server from which no response is received. For this reason, if the corresponding name is not found as a result of DNS name resolution (although communication is successful), a DNS server used as an alternative is not queried. That is, when a typical DNS client such as in the Linux system is used, it is difficult to implement DNS name resolution in each network.

SUMMARY

An aspect of the present disclosure provides a mechanism for performing name resolution using a suitable DNS server for each network interface while utilizing a mechanism (resource) of a typical DNS client. Another aspect of the present disclosure improves network connectivity of a communication apparatus having a plurality of interfaces.

According to an aspect of the present disclosure, a communication apparatus for transmitting data to an external device via a plurality of different communication interfaces includes a processor and a memory storing instructions that, when the instructions are executed by the processor, cause the processor to perform operations including: causing the communication apparatus to operate as a first domain name system (DNS) client configured to query a first DNS server accessible via a first communication interface among the plurality of different communication interfaces to perform name resolution, causing the communication apparatus to operate as a relay server, and causing the communication apparatus to operate as a communication application configured to transmit data to a destination identified by a host name, wherein the relay server includes a second DNS client configured to query a second DNS server accessible via a second communication interface among the plurality of different communication interfaces to perform name resolution, wherein the communication application (i) requests the first DNS client to resolve the host name when transmitting the data to the destination identified by the host name via the first communication interface, and (ii) transmits the data to the relay server when transmitting the data to the destination identified by the host name via the second communication interface, and wherein the relay server performs name resolution for the destination identified by the host name by using the second DNS client Further features of the present disclosure will become apparent from the following description of exemplary embodiments with reference to the attached drawings.

DESCRIPTION OF THE EMBODIMENTS

The following describes embodiments of the present disclosure with reference to the drawings. The following embodiments are not intended to limit the disclosure set forth in the appended claims, and not all of the combinations of the features described in the embodiments are required.

First Embodiment

Figure 1:
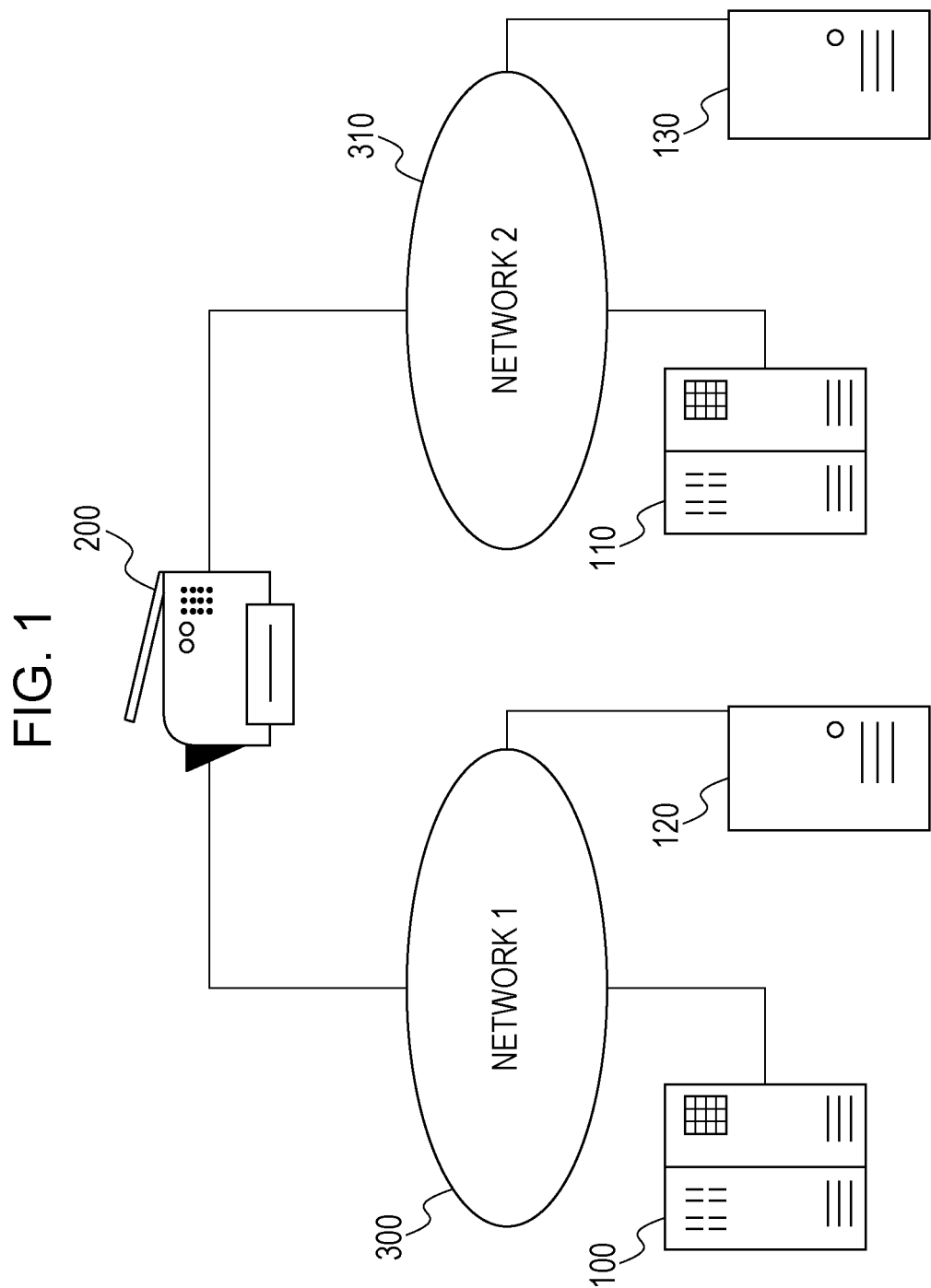
FIG. 1 is a diagram illustrating an example of a communication system.

First, the configuration of a communication system according to an embodiment of the present disclosure will be described with reference to FIG. 1. In the communication system according to this embodiment, an MFP 200, a DNS server 100, and a device 120 are communicably connected to each other via network 1 (300). The device 120 is assigned a host name that is managed by the DNS server 100. Also, the MFP 200, a DNS server 110, and a device 130 are communicably connected to each other via network 2 (310). The device 130 is assigned a host name that is managed by the DNS server 110.

In this embodiment, the network 1 (300) and the network 2 (310) are assumed to be independent, different networks. That is, even if the DNS server 100 is requested to resolve the host name of the device 130, the DNS server 100 is unable to resolve the host name of the device 130. Conversely, even if the DNS server 110 is requested to resolve the host name of the device 120, the DNS server 110 is unable to resolve the host name of the device 120.

The MFP 200 is an example of a communication apparatus. In this embodiment, as a non-limiting example, the MFP 200 is an MFP having a printing function and a scanning function. The MFP 200 may be implemented as an Internet of Things (IoT) device, a personal computer, an edge server, or the like. Each of the device 120 and the device 130 is assumed to be, for example, but not limited to, a file server or an information management server that manages information on the MFP 200. The device 120 and the device 130 may be servers in an infrastructure system or cloud servers.

The MFP 200 is capable of transmitting data based on an image obtained through scanning to the device 120 or 130 or transmitting data collected by the MFP 200 to the device 120 or 130. The MFP 200 transmits data using an address specifying the host name of the device 120 or 130. The method for name resolution in this case will be described below.

Figure 2:
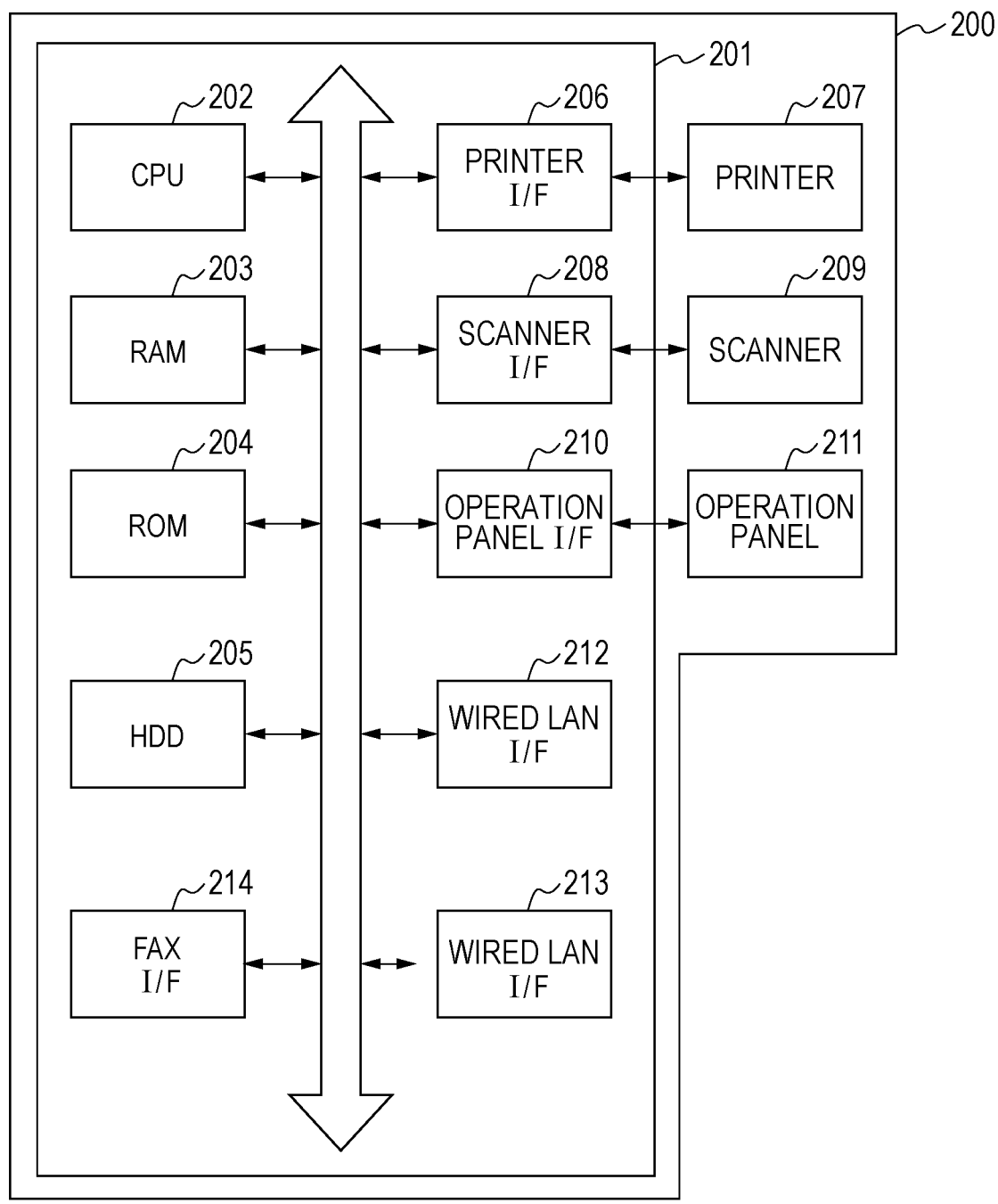
FIG. 2 is a diagram illustrating an example hardware configuration of an MFP.

Then, the MFP 200 will be described with reference to FIG. 2. FIG. 2 is a block diagram illustrating the hardware configuration of the MFP 200. The MFP 200 has a reading function of reading an image on a sheet, a file transmission function of transmitting the read image to an external communication apparatus, and any other function. The MFP 200 also has a printing function of printing an image on a sheet.

A control unit 201 including a central processing unit (CPU) 202 controls the overall operation of the MFP 200. The CPU 202 reads a control program stored in a read only memory (ROM) 204 or a hard disk drive (HDD) 205 to perform various types of control such as printing control and reading control. The ROM 204 stores a control program executable by the CPU 202. A random access memory (RAM) 203 is a main memory for the CPU 202 and is used as a work area or a temporary storage area into which various control programs are loaded. The HDD 205 stores print data, image data, various programs, and various types of setting information. As described above, hardware components, such as the CPU 202, the ROM 204, and the RAM 203, constitute a computer.

In the MFP 200 according to this embodiment, a single CPU 202 executes processes illustrated in flowcharts described below by using a single memory (i.e., the RAM 203). However, any other form may be used. For example, a plurality of processors, RAMs, ROMs, and storage devices may cooperate with each other to execute the processes illustrated in the flowcharts described below. Alternatively, some of the processes may be executed using a hardware circuit.

A printer interface (I/F) 206 connects a printer 207 (printer engine) and the control unit 201 to each other. The printer 207 executes a printing process on a sheet fed from a sheet feed cassette (not illustrated) on the basis of print data input via the printer I/F 206.

A scanner I/F 208 connects a scanner 209 and the control unit 201 to each other. The scanner 209 reads a document placed on the scanner 209 to generate image data. The image data generated by the scanner 209 is printed using the printer 207, stored in the HDD 205, or transmitted to an external device via a facsimile (FAX) I/F 214 or a wired LAN I/F 212 or 213.

An operation panel I/F 210 connects an operation panel 211 and the control unit 201 to each other. The operation panel 211 includes a liquid crystal display unit having a touch panel function, various hard keys, and so on, and functions as a display unit that displays information or an acceptance unit that accepts instructions from a user.

Network cables are connected to the wired LAN I/Fs 212 and 213 to communicate with external devices over networks.

The wired LAN I/F 212 is a first communication interface of the MFP 200 and is connected to the network 1 (300). The wired LAN I/F 213 is a second communication interface of the MFP 200 and is connected to the network 2 (310).

A telephone line cable is connected to the FAX I/F 214, and the FAX I/F 214 is connected to a telephone network via analog communication or Integrated Services Digital Network (ISDN) communication.

Figure 3:
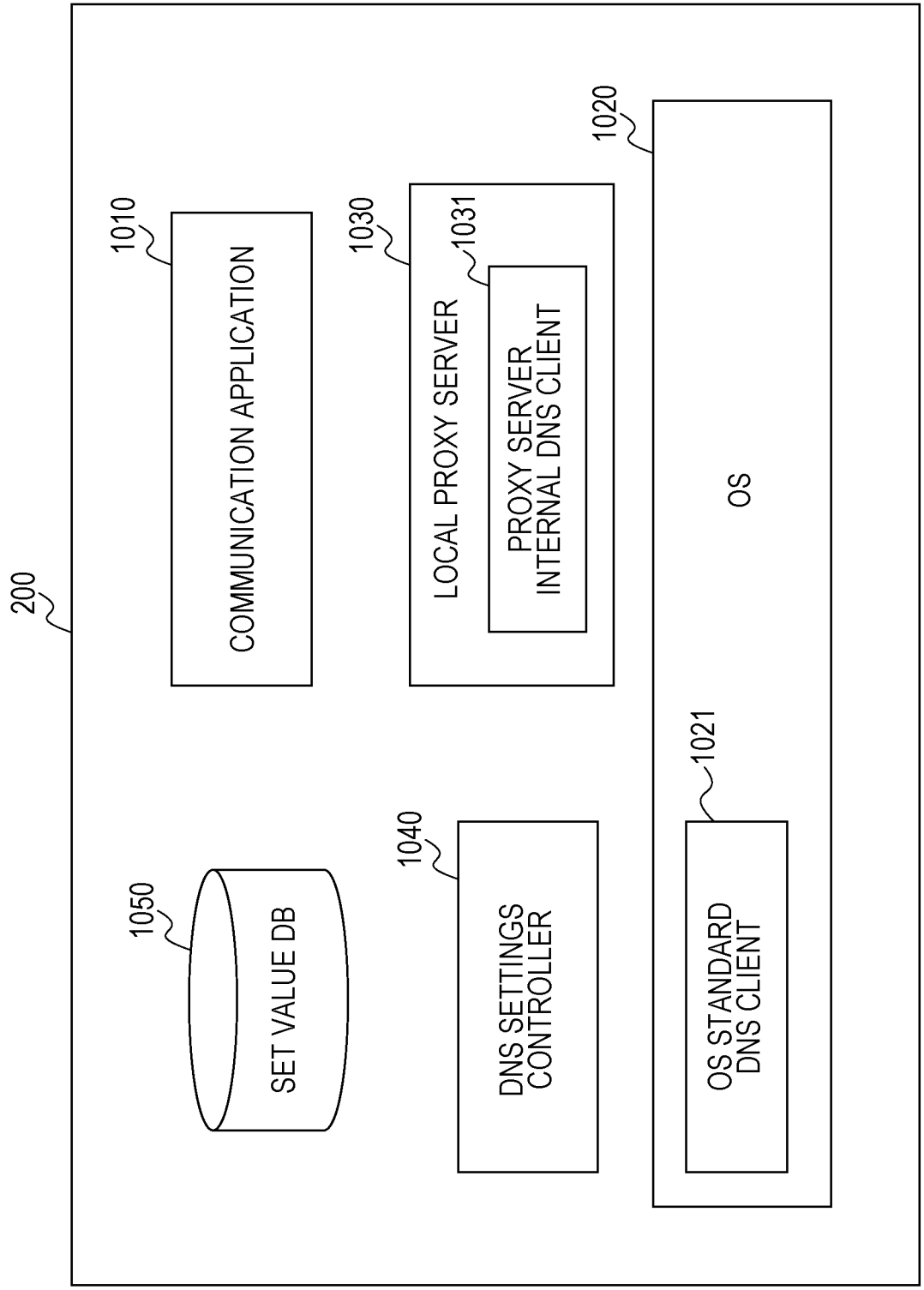
FIG. 3 is a diagram illustrating an example software configuration of the MFP.

Next, the software configuration of the MFP 200 will be described with reference to FIG. 3.

A communication application 1010 is an application that communicates with the device 120 on the network 1 (300) and the device 130 on the network 2 (310). For example, the communication application 1010 is a transmission application that transmits data to a device via communication based on Hypertext Transfer Protocol (HTTP), such as Web Distributed Authoring and Versioning (WebDAV). The transmission application is capable of transmitting a file based on an image obtained by reading a document using the scanner 209 to an external device. In a first embodiment, the interface to be used by the communication application 1010 is set in advance in accordance with the user's operation or the like.

An operating system (OS) 1020 includes a Transmission Control Protocol/Internet Protocol (TCP/IP) stack for performing network communication, and an OS standard DNS client 1021 for performing DNS name resolution. In this embodiment, the OS standard DNS client 1021 is assumed to be a standard DNS client in the Linux (registered trademark) system. To resolve a domain name using such a client, a description, such as "name server 'IP address of a DNS server'", is contained in a file at "/etc/resolv.conf" to specify a DNS server. A plurality of DNS servers to be used may be designated for redundancy. However, each DNS server designated here is a DNS server for redundancy, which is used as an alternative to a registered DNS server from which no response is received. For this reason, if the corresponding name is not found as a result of DNS name resolution (although communication is successful), a DNS server used as an alternative is not queried. That is, when a DNS client in the Linux system is used, it is difficult to implement DNS name resolution in each network.

This embodiment describes a mechanism for performing name resolution using a local proxy server 1030 including an independent internal DNS client within the MFP 200. Specifically, HTTP/HTTPS (HTTP over Secure Sockets Layer (SSL)/Transport Layer Security (TLS)) communication over which data is transmitted to the network 2 (310) is allocated to communication via a proxy server to cause the local proxy server 1030 to perform name resolution by proxy to facilitate smooth host name resolution. If the local proxy server 1030 supports other protocols, communication based on such protocols may also be performed via the local proxy server 1030. Hereinafter, HTTP communication or HTTPS communication is referred to as HTTP(S).

A specific mechanism will be described hereinafter. To allow quick view of a website or control an accessible website, the local proxy server 1030 provides a function to, upon receipt of a request to connect to a website (HTTP or HTTPS communication), connect to the website by proxy and perform communication. In this embodiment, the local proxy server 1030 is assumed to be configured by using squid or delegate and a software module.

A DNS settings controller 1040 provides a function to set, for the OS standard DNS client 1021 and a proxy server internal DNS client 1031, DNS servers to be referred to by the respective clients. Specifically, the OS standard DNS client 1021 is assigned the DNS server 100, which manages DNS names on the network 1 (300), as the communication destination. On the other hand, the proxy server internal DNS client 1031 is assigned the DNS server 110, which manages DNS names on the network 2 (310), as the communication destination. That is, the OS standard DNS client 1021 is set to be capable of resolving DNS names on the network 1 (300), and the proxy server internal DNS client 1031 is set to be capable of resolving DNS names on the network 2 (310).

A set value database (DB) 1050 stores DNS settings and set values of the communication application 1010.

Figure 4:
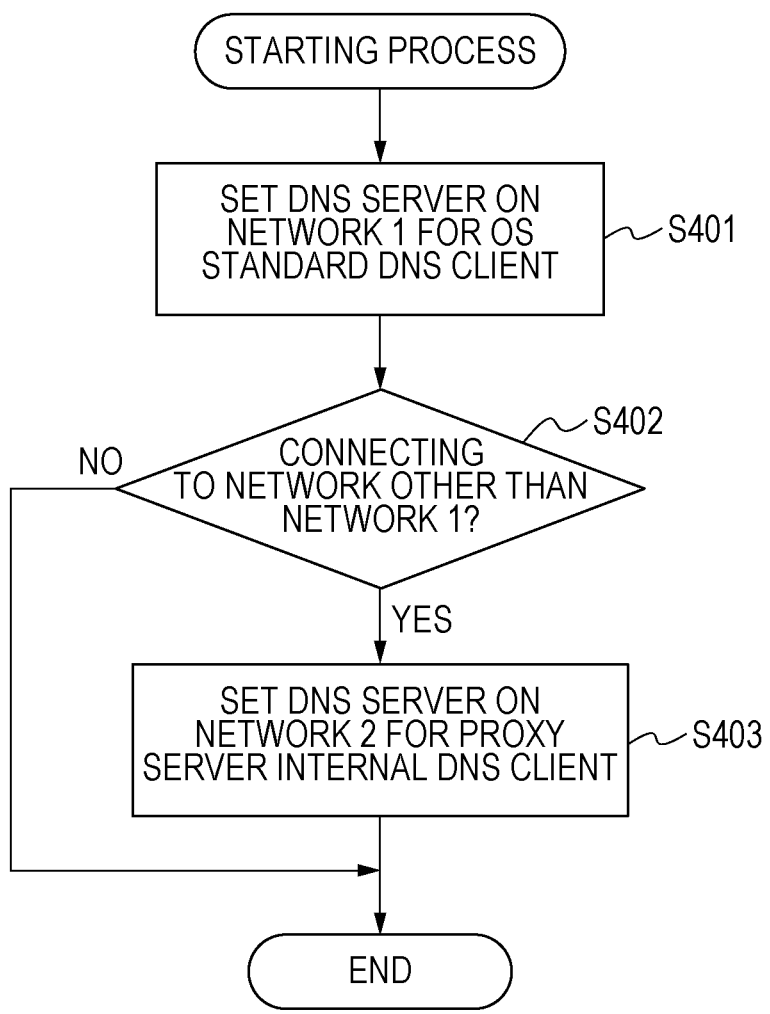
FIG. 4 is a flowchart illustrating an example of start control of the MFP.
Figure 5:
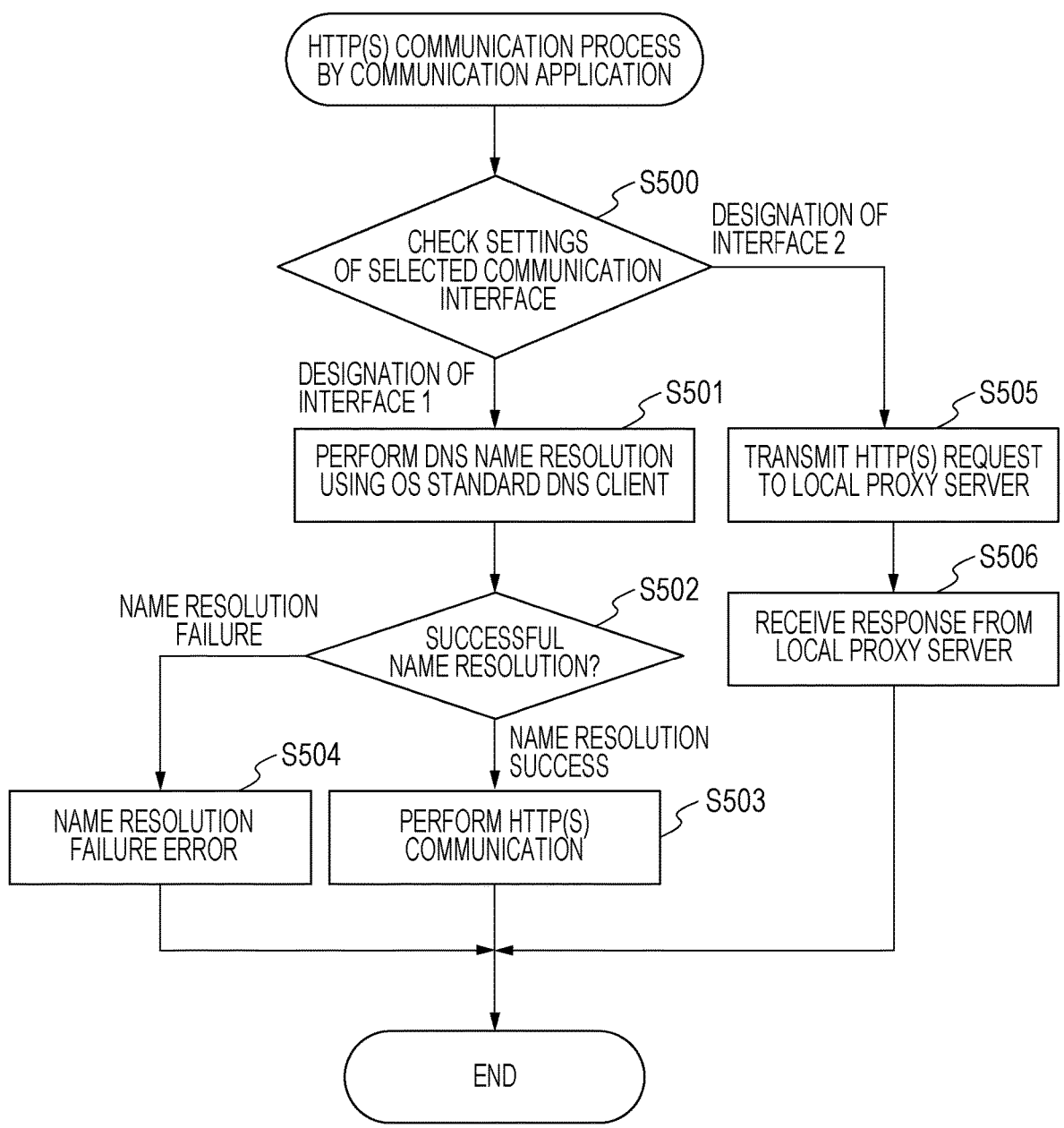
FIG. 5 is a flowchart illustrating an example of destination control performed by a communication application.
Figure 7:
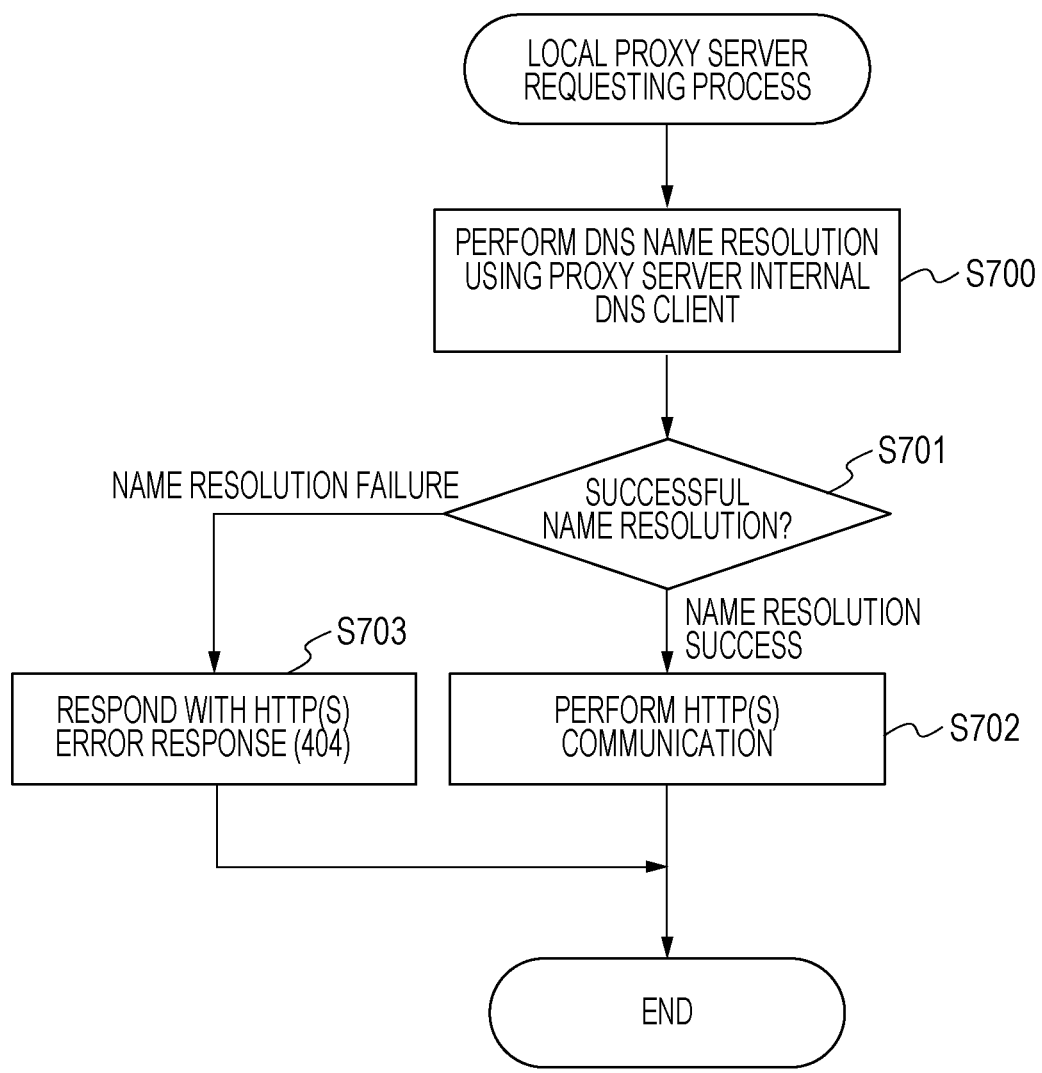
FIG. 7 is a flowchart illustrating an example of a name resolution process using a local proxy server.

Specific control will be described with reference to flowcharts illustrated in FIGS. 4, 5, and 7. Each of the operations (steps) illustrated in the flowcharts illustrated in FIGS. 4, 5, and 7 is implemented by the CPU 202 loading a program for implementing each control module stored in the ROM 204 or the HDD 205 into the RAM 203 and executing the program. Note that a data transmission and reception process or the like is assumed to be performed by cooperation between the CPU 202 and each communication unit I/F. In addition, a case where it is desirable to clarify the subject of processing will be described using as the subject a software module executed by the CPU 202.

FIG. 4 illustrates a process flow to be executed by the DNS settings controller 1040 when the MFP 200 is started or when DNS settings are changed.

In S401, when a DNS setting process is started, the DNS settings controller 1040 sets the DNS server 100 on the network 1 (300) for the OS standard DNS client 1021. Information saved in the set value DB 1050 is used as DNS server information for the network 1 (300).

In S402, the DNS settings controller 1040 determines whether the MFP 200 is connecting to any network other than the network 1 (300). If it is determined that there is connection to a network other than the network 1 (300), the process proceeds to S403. On the other hand, if it is determined that there is no connection to a network other than the network 1 (300) (the settings indicate that only the first communication interface is used), the series of DNS setting operations ends.

In S403, the DNS settings controller 1040 starts the local proxy server 1030 and sets the DNS server 110 on the network 2 (310) for the proxy server internal DNS client 1031, which is a DNS client to be used for the network 2 (310). Information saved in the set value DB 1050 is used as DNS server information for the network 2 (310). Accordingly, setting for the respective DNS clients to be used for the network 1 (300) and the network 2 (310) is complete, and DNS name resolution for the respective networks is enabled.

Next, a process for HTTP/HTTPS communication performed by the communication application 1010 using a destination identified by a host name will be described with reference to the flowchart illustrated in FIG. 5 and an operation screen illustrated in FIG. 6.

Figure 6:
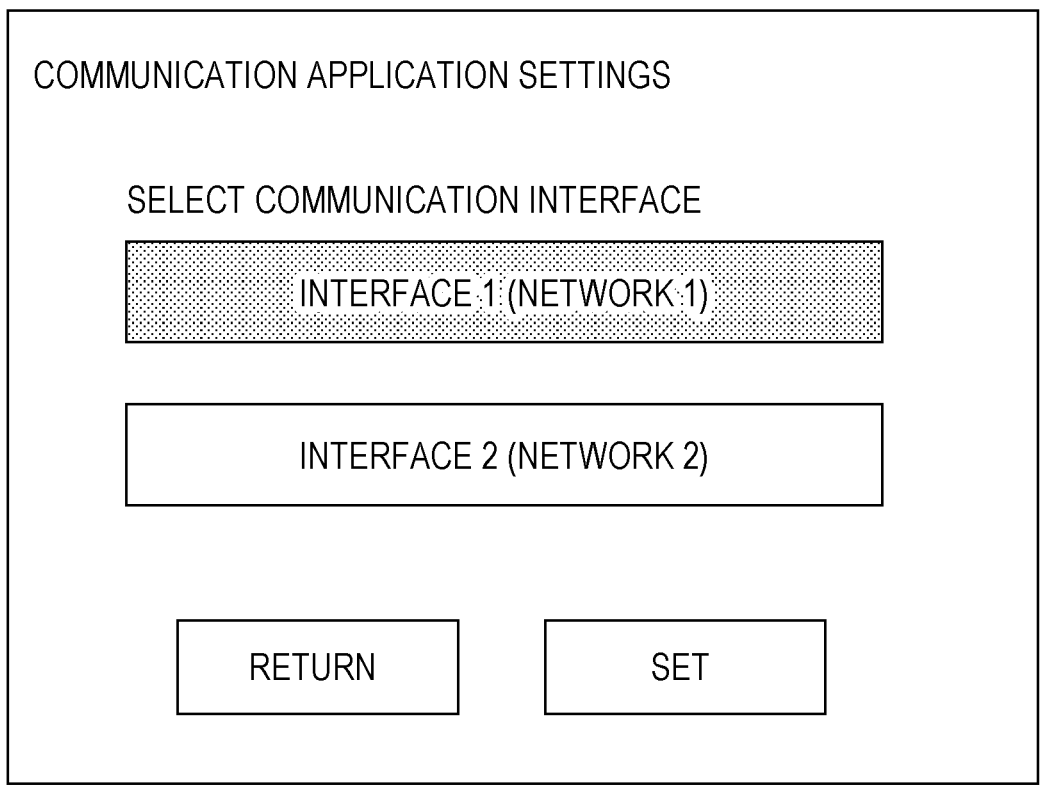
FIG. 6 is a diagram illustrating an example of a settings screen related to the communication application.

FIG. 6 illustrates an example of a settings screen for the communication application 1010, which is displayed on the operation panel 211. A user is able to set the interface to be used by the communication application 1010 through the settings screen illustrated in FIG. 6. When "Interface 1 (network 1)" is selected, the setting is obtained such that communication is performed using the wired LAN I/F 212. When "Interface 2 (network 2)" is selected, the setting is obtained such that communication is performed using the wired LAN I/F 213. The setting is stored in the set value DB 1050 described above. The communication application 1010 determines the interface at the output destination on the basis of the setting.

Next, control in a case where the communication application 1010 transmits data to an external destination identified by a host name via HTTP or HTTPS communication will be described with reference to the flowchart illustrated in FIG. 5.

In S500, the communication application 1010 refers to the set value DB 1050 and determines a selected communication interface. When the interface 1 (the wired LAN I/F 212) is designated, the process proceeds to S501. When the interface 2 (the wired LAN I/F 213) is designated, the process proceeds to S505.

In S501, the communication application 1010 requests the OS standard DNS client 1021 used for the network 1 (300) to perform DNS name resolution. If the communication destination is identified by the IP address, the processing of S501 and S502 is skipped, and the communication application 1010 proceeds directly to S503 and performs communication.

In S502, the communication application 1010 determines whether name resolution is successful on the basis of the result of DNS name resolution performed by the OS standard DNS client 1021 in response to the request. If the name resolution is successful, the process proceeds to S503. If the name resolution has failed, the process proceeds to S504. If the name resolution is successful, the IP address of the communication destination is obtained.

In S503, the communication application 1010 cooperates with the OS 1020 and the wired LAN I/F 212 to perform HTTP(S) communication with the designated destination. When communication is complete, the series of operations ends.

In S504, the communication application 1010 displays an error. For example, the communication application 1010 outputs a message indicating that communication has failed or outputs an error sound.

A process performed when the network 2 (310) (the wired LAN I/F 213) is selected will now be described. In S505, the communication application 1010 transfers an HTTP(S) request to the local proxy server 1030. The details of the processing of S505 will be described below with reference to FIG. 7. In S506, the communication application 1010 receives a response from the local proxy server 1030 and displays a communication result based on the response.

Next, a process performed by the local proxy server 1030 in the MFP 200 upon receipt of the transferred HTTP(S) request will now be described with reference to the flowchart illustrated in FIG. 7.

In S700, the local proxy server 1030 receives an HTTP(S) request transferred from the communication application 1010 and performs name resolution for a uniform resource locator (URL) included in the request by using the proxy server internal DNS client 1031. The DNS server 110 is designated as the destination to be queried by the proxy server internal DNS client 1031. Thus, the DNS server 110 is queried for the IP address corresponding to the URL.

In S701, the local proxy server 1030 determines whether name resolution for the URL (i.e., the host name), which is designated as the destination, is successful on the basis of the response from the DNS server 110. If the name resolution is successful, the process proceeds to S702. If the name resolution has failed, the process proceeds to S703.

In S702, the local proxy server 1030 performs HTTP(S) communication with the destination obtained as a result of the name resolution and responds to the communication application 1010 with a response result. Then, the series of control operations ends. In S703, the local proxy server 1030 responds to the communication application 1010 with error information indicating that HTTP(S) communication has failed. Then, the series of operations ends.

As described above, this embodiment provides control such that every HTTP/HTTPS communication to be transmitted to the network 2 (310), which is connected to the wired LAN I/F 213, is performed via the local proxy server 1030. This enables a DNS client included in the local proxy server 1030 to perform name resolution, facilitating smooth host name resolution.

Second Embodiment

The first embodiment describes settings of the communication application 1010 such that the LAN I/F via which communication is to be performed is set in advance. The first embodiment further describes a mechanism for switching between a case where the communication application 1010 requests the local proxy server 1030 to transfer HTTP communication and a case where the communication application 1010 attempts communication without using the local proxy server 1030, in accordance with the settings of the communication application 1010.

A second embodiment provides a mechanism for allowing appropriate name resolution even when the settings of the communication application 1010 are not set in advance. Specifically, an attempt is made to determine whether it is possible to perform name resolution on the wired LAN I/F 213 side. If it is not possible to perform name resolution, the host name for which the name resolution has failed is added to an exclusion list containing host names for which the local proxy server 1030 is not used.

A hardware configuration and a software configuration according to the second embodiment are similar to those according to the first embodiment and will not be described.

Figure 8:
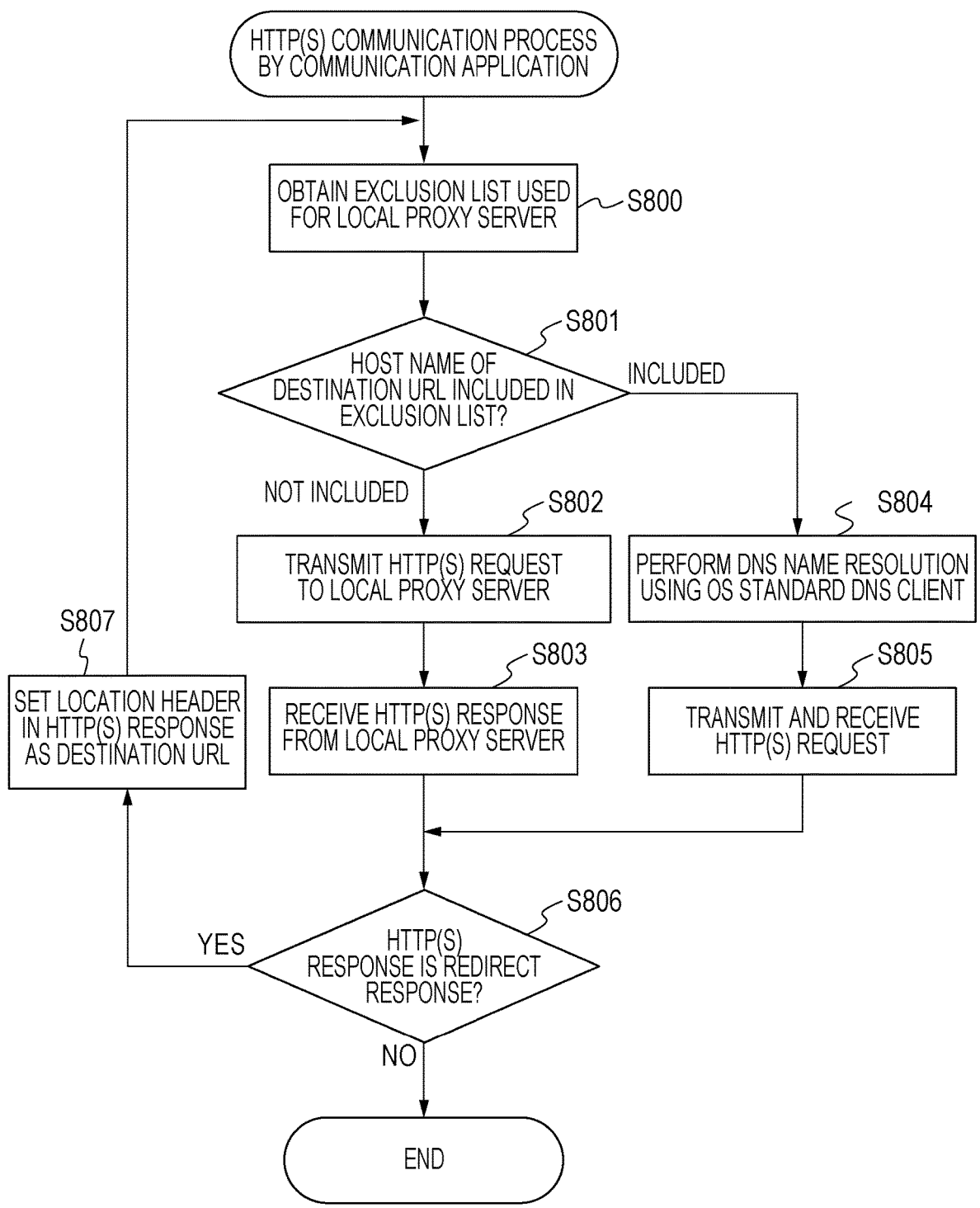
FIG. 8 is a flowchart illustrating an example of communication control according to a second embodiment.
Figure 9:
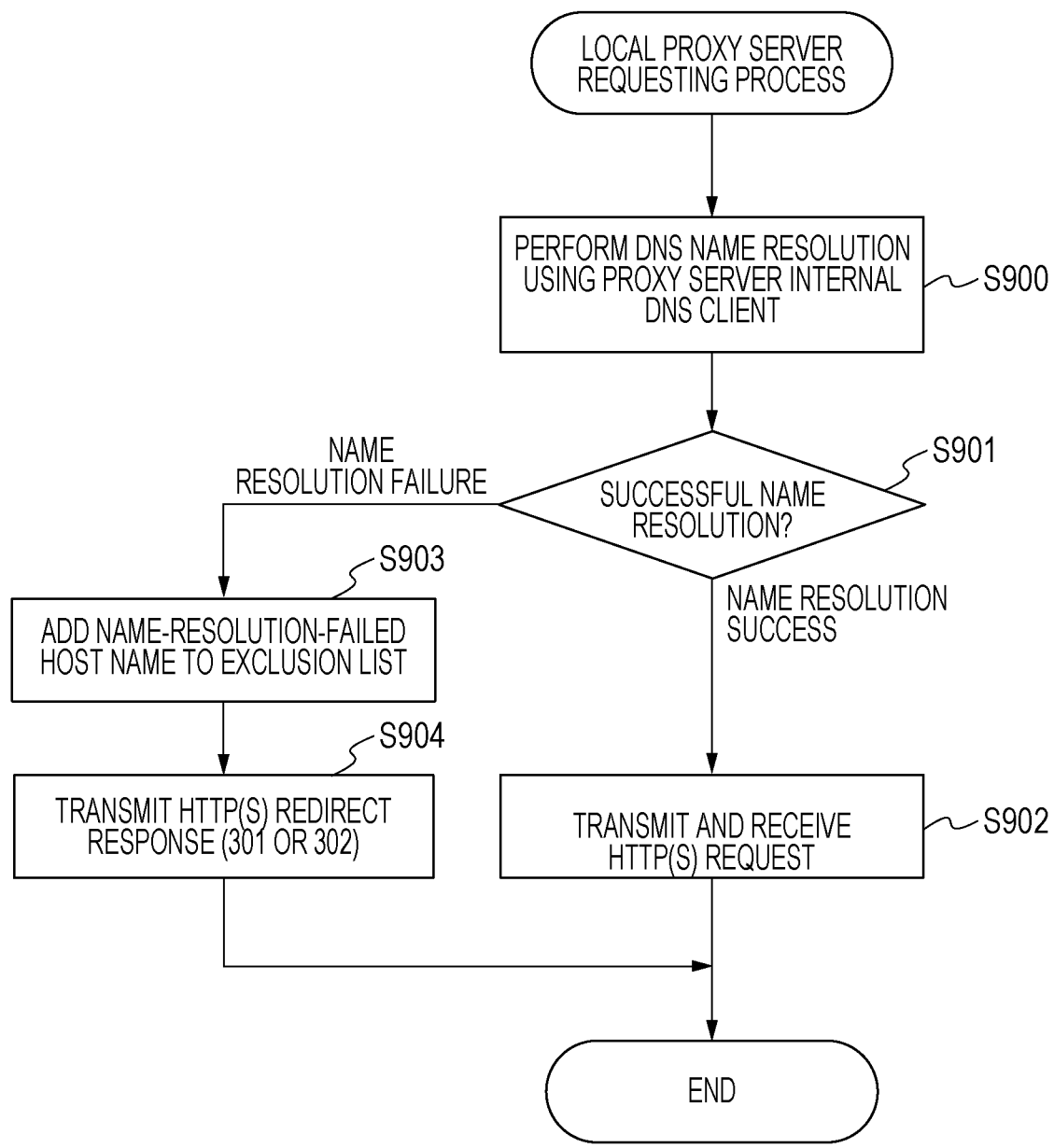
FIG. 9 is a flowchart illustrating an example of communication control according to the second embodiment.

Specific control will be described with reference to flowcharts illustrated in FIGS. 8 and 9. Each of the operations (steps) illustrated in the flowcharts illustrated in FIGS. 8 and 9 is implemented by the CPU 202 loading a program for implementing each control module stored in the ROM 204 or the HDD 205 into the RAM 203 and executing the program. Note that a data transmission and reception process or the like is assumed to be performed by cooperation between the CPU 202 and each communication unit I/F. In addition, a case where it is desirable to clarify the subject of processing will be described using as the subject a software module executed by the CPU 202.

FIG. 8 illustrates control of the communication application 1010, which is performed in place of the flowchart illustrated in FIG. 5 according to the first embodiment.

In S800, the communication application 1010 obtains an exclusion list corresponding to the local proxy server 1030 from the set value DB 1050.

The exclusion list is a list of host names for direct connection without using the local proxy server 1030. A new registration to the exclusion list is performed by a privileged user such as an administrator. In the flowchart illustrated in FIG. 9 described below, new registration is also performed when communication has failed.

In S801, the communication application 1010 determines whether the exclusion list obtained in S800 includes the host name of the destination URL. If the exclusion list includes the host name of the destination URL, the process proceeds to S804. If the exclusion list does not include the host name of the destination URL, the process proceeds to S802. The processing of S801 is a process to determine whether the host name of the destination URL matches any of the host names in the exclusion list.

In S802, the communication application 1010 transfers an HTTP(S) request to the local proxy server 1030. Then, in S803, the communication application 1010 receives a response indicating a communication result from the local proxy server 1030.

On the other hand, in S804, the communication application 1010 cooperates with the OS standard DNS client 1021 to resolve the host name indicating the destination. If the name resolution is successful, the process proceeds to S805. If the name resolution has failed, the communication application 1010 displays an error. Then, the series of operations ends.

In S805, the communication application 1010 transmits an HTTP(S) request to the IP address obtained in S804.

In the process described above, as an example, the exclusion list contains the host name "example.com". When connecting to "http://example.com", the communication application 1010 directly performs HTTP(S) communication without using the local proxy server 1030 since the destination is included in the exclusion list. When connecting to "http://example.net", which is not included in the exclusion list, the communication application 1010 transmits an HTTP(S) request to the local proxy server 1030.

Then, in S806, the communication application 1010 determines whether the received HTTP(S) response is a redirect response. If the received HTTP(S) response is a redirect response, the process proceeds to S807. If the received HTTP(S) response is not a redirect response, the series of transmission control operations ends.

The term "redirect response" refers to a response with HTTP status code 301 or 302. In the case of a redirect response, the process proceeds to S807, and the communication application 1010 attempts to access the redirect destination URL.

In S807, the communication application 1010 sets the destination identified in the location header of the received HTTP(S) response as a new destination of the HTTP(S) request. When the setting is complete, the process returns to S800, and the communication application 1010 attempts to perform communication using the host name of the redirect destination.

Next, control of the local proxy server 1030 will be described with reference to the flowchart illustrated in FIG. 9. FIG. 9 illustrates an example of control performed in place of the control illustrated in FIG. 7 according to the first embodiment.

In S900, the local proxy server 1030 performs name resolution for the destination (host name) designated by the communication application 1010 by using the proxy server internal DNS client 1031.

In S901, the local proxy server 1030 determines whether name resolution is successful. If the name resolution is successful, the process proceeds to S902. If the name resolution has failed, the process proceeds to S903.

In S902, the local proxy server 1030 performs HTTP(S) communication using the IP address obtained as a result of the name resolution and responds to the communication application 1010 with a response.

In S903, the local proxy server 1030 newly registers in its managed exclusion list the host name for which the name resolution has failed.

For example, if the local proxy server 1030 has received a request to "http://example2/test" and name resolution for the destination has failed, the local proxy server 1030 registers "example2" in the exclusion list. Through the processing of S903, when the same domain name is designated again, communication without using the local proxy server 1030 can be performed.

Then, in S904, the local proxy server 1030 generates an HTTP(S) redirect response and returns the response to the communication application 1010. When transmission is complete, the series of name resolution operations ends.

The redirect response contains HTTP response status code 301 or 302, and the host name for which the name resolution has failed in S901, is set in the location header indicating the redirect destination.

For example, in the case of a request to "http://example2/test", the local proxy server 1030 sets HTTP status code 301. Further, the local proxy server 1030 transmits response data containing "Location: http://example2/test" in the HTTP header.

As described above, if the local proxy server 1030 is unable to resolve the host name of the destination, the local proxy server 1030 registers the destination in its exclusion list. Accordingly, the local proxy server 1030 is no longer requested for the destination in the next and subsequent accesses.

Furthermore, redirect processing is performed to attempt a connection to a destination that is newly registered in the exclusion list via another network. Through this processing, the OS standard DNS client 1021 can now be utilized to perform name resolution using the DNS server 100 on the network 1 (300).

Accordingly, each application in the MFP 200, such as the communication application 1010, can perform name resolution using a suitable network, regardless of the communication interface, to perform communication.

Third Embodiment

The first and second embodiments describe a mechanism for appropriately performing name resolution for communication via proxy, such as HTTP or HTTPS communication, by using the local proxy server 1030.

In a third embodiment, a plurality of DNS clients are prepared to appropriately perform name resolution also for communication not handled by a proxy server.

Figure 10:
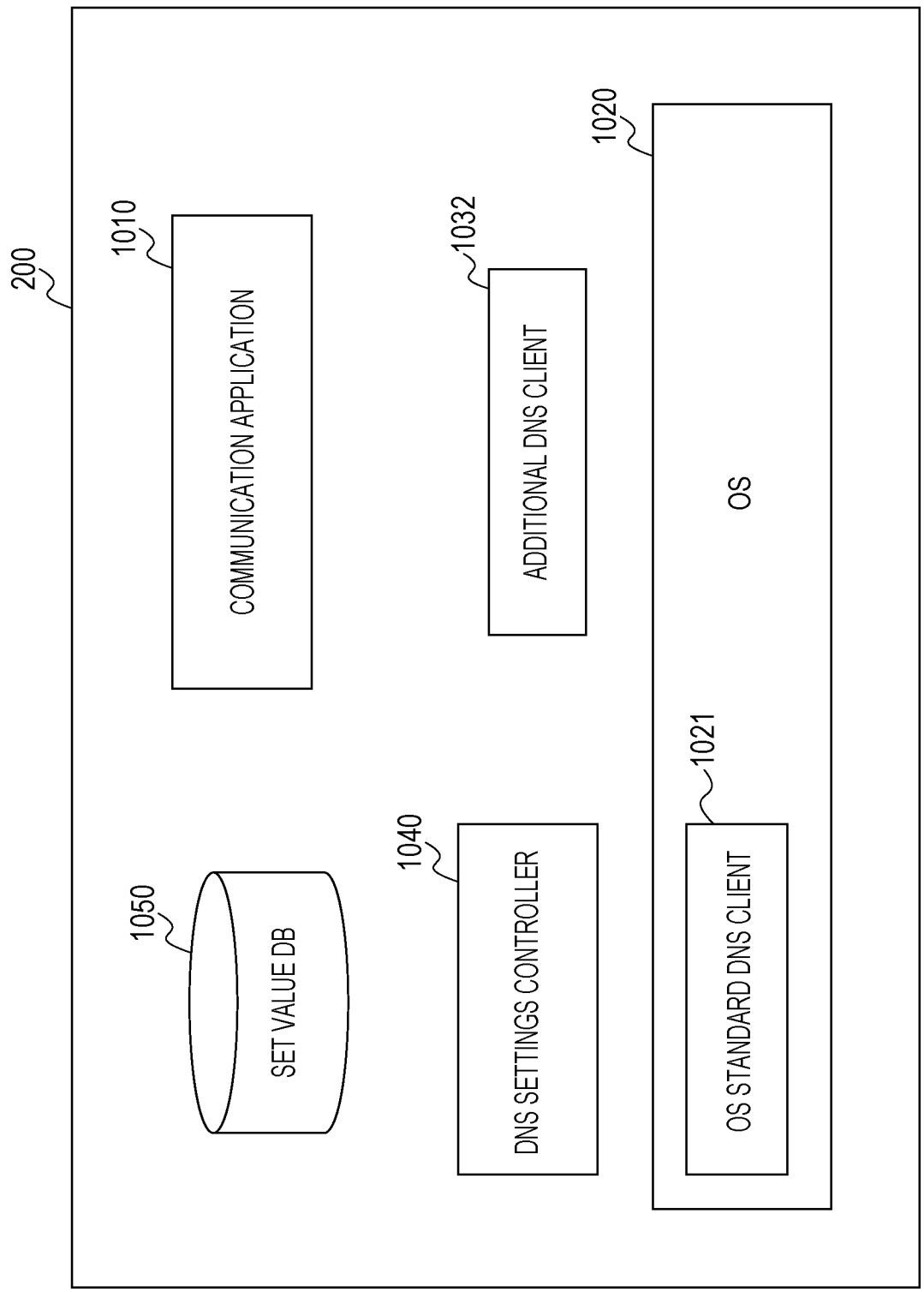
FIG. 10 is a diagram illustrating an example software configuration according to a third embodiment.

A hardware configuration according to the third embodiment is similar to that according to the first embodiment and will not be described. FIG. 10 illustrates an example software configuration of an MFP 200 according to the third embodiment.

Unlike the first embodiment described with reference to FIG. 3, the MFP 200 includes an additional DNS client 1032 in place of the local proxy server 1030.

The additional DNS client 1032 is a DNS client that performs DNS name resolution in a way similar to that of the OS standard DNS client 1021.

The DNS settings controller 1040 provides a function to set DNS servers that query the OS standard DNS client 1021 and the additional DNS client 1032. Specifically, the OS standard DNS client 1021 is assigned the DNS server 100, which manages DNS names on the network 1 (300), as the communication destination. On the other hand, the additional DNS client 1032 is assigned the DNS server 110, which manages DNS names on the network 2 (310), as the communication destination.

Figure 11A:
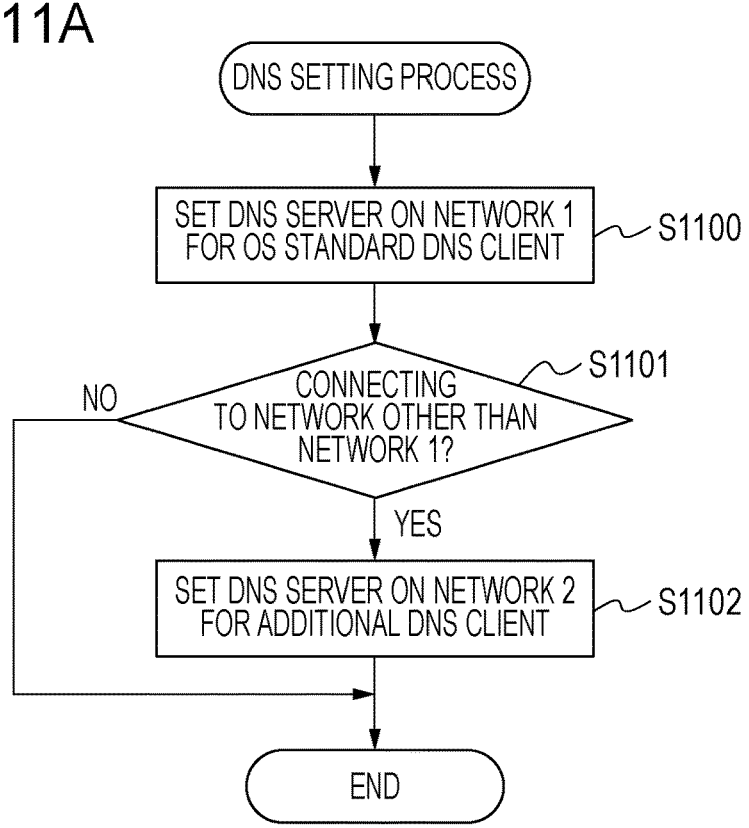
FIGS. 11A and 11B are flowcharts illustrating an example of communication control according to the third embodiment.
Figure 11B:
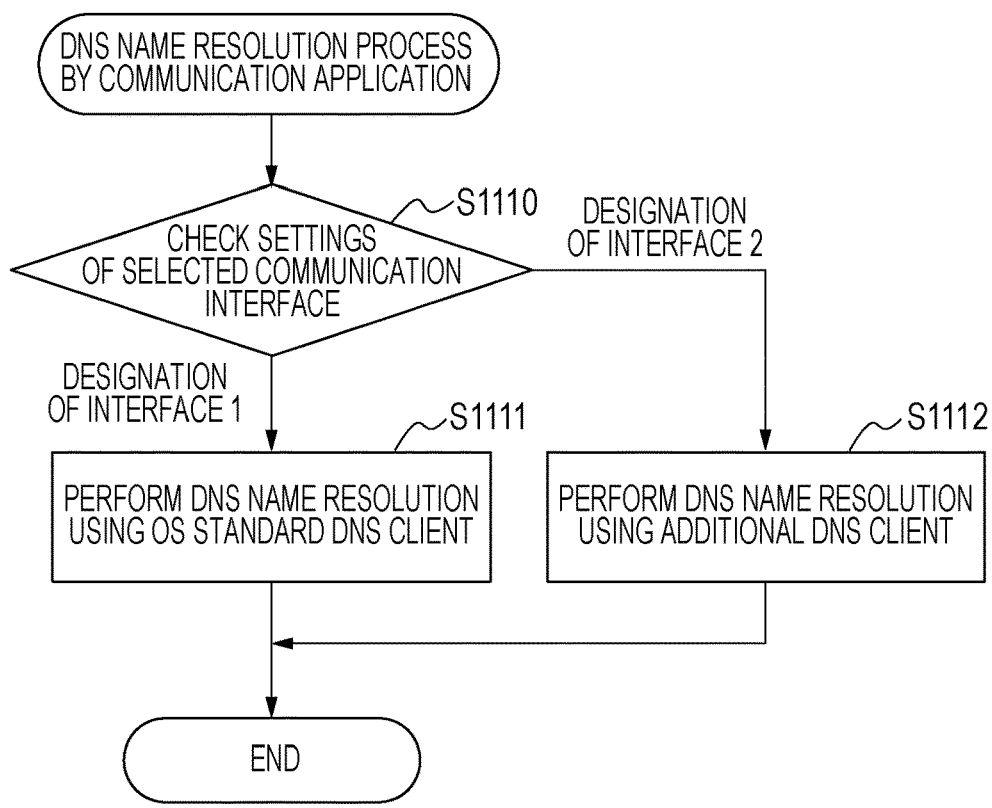

Specific control will be described with reference to flowcharts illustrated in FIGS. 11A and 11B. Each of the operations (steps) illustrated in the flowcharts illustrated in FIGS. 11A and 11B is implemented by the CPU 202 loading a program for implementing each control module stored in the ROM 204 or the HDD 205 into the RAM 203 and executing the program. Note that a data transmission and reception process or the like is assumed to be performed by cooperation between the CPU 202 and each communication unit I/F. In addition, a case where it is desirable to clarify the subject of processing will be described using as the subject a software module executed by the CPU 202.

FIG. 11A is a flowchart illustrating a process executed in place of the process illustrated in FIG. 4 according to the first embodiment, and FIG. 11B is a flowchart illustrating a process executed in place of the process illustrated in FIG. 5 according to the first embodiment.

First, a setting process at the start of the MFP 200 will be described with reference to FIG. 11A. In S1100, the DNS settings controller 1040 sets the DNS server 100 on the network 1 (300) for the OS standard DNS client 1021.

Information saved in the set value DB 1050 is used as DNS server information for the network 1 (300). In S1101, the DNS settings controller 1040 determines whether a connection to another network (the network 2 (310)) is established. If a connection to another network (the network 2 (310)) is established, the process proceeds to S1102. If a connection to another network (the network 2 (310)) is not established, the series of operations ends. In S1102, the DNS settings controller 1040 sets the DNS server 110 on the network 2 (310) for the additional DNS client 1032. Information saved in the set value DB 1050 is used as DNS server information for the network 2 (310).

Next, control of the communication application 1010 will be described with reference to FIG. 11B. In S1110, the communication application 1010 refers to the set value DB 1050 and determines a selected communication interface. If the network 1 (300) (the wired LAN I/F 212) is designated, the process proceeds to S1111. If the network 2 (310) (the wired LAN I/F 213) is designated, the process proceeds to S1112.

In S1111, the communication application 1010 requests the OS standard DNS client 1021 used for the network 1 (300) to perform DNS name resolution.

On the other hand, in S1112, the communication application 1010 requests the additional DNS client 1032 used for the network 2 (310) to perform DNS name resolution.

If the name resolution is successful, the communication application 1010 communicates with the destination device on the basis of the IP address obtained as a result of the name resolution. If the name resolution has failed, the communication application 1010 displays an error. Then, the series of operations ends.

Fourth Embodiment

The third embodiment describes control in which a plurality of DNS clients are started such that the DNS clients are used by a communication application. A fourth embodiment describes a method for reconfiguring the settings of the OS standard DNS client 1021, thereby performing name resolution using a single DNS client.

Figure 12:
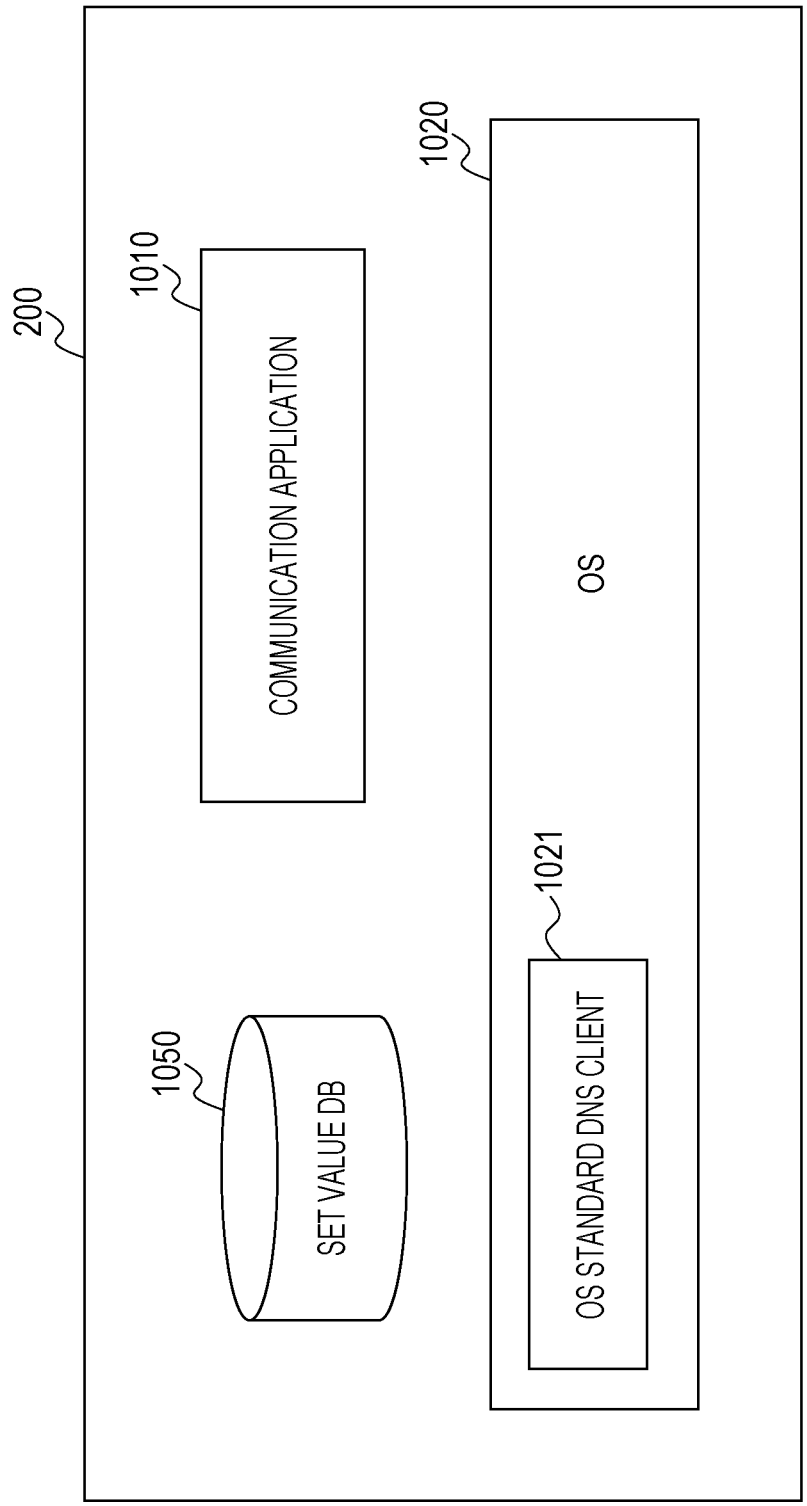
FIG. 12 is a diagram illustrating an example software configuration according to a fourth embodiment.

A hardware configuration according to this embodiment is similar to that according to the third embodiment and will not be described. FIG. 12 illustrates an example software configuration according to the fourth embodiment. Unlike the first embodiment described with reference to FIG. 3, the MFP 200 does not include the local proxy server 1030.

Figure 13:
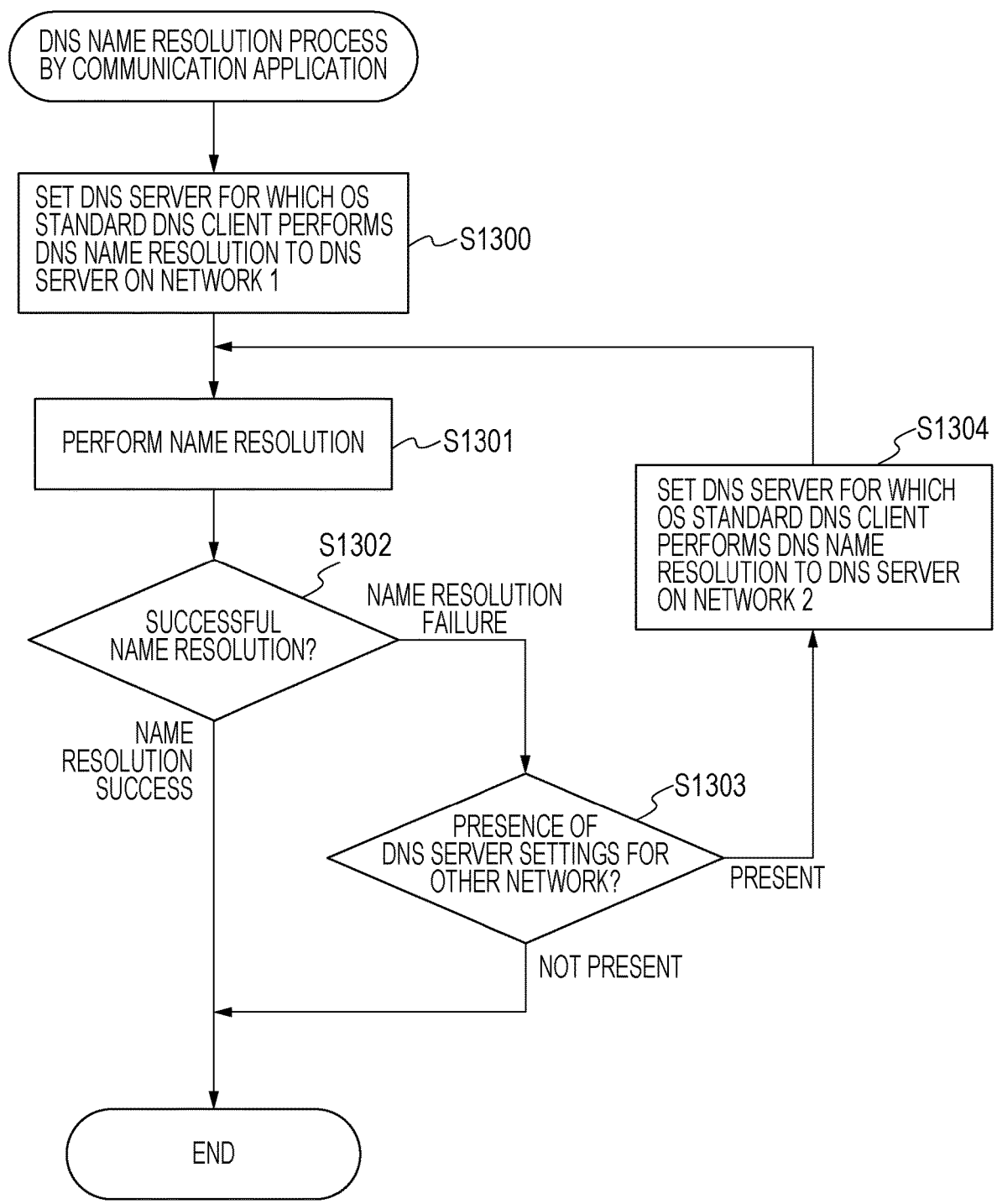
FIG. 13 is a flowchart illustrating an example of communication control according to the fourth embodiment.

Specific control will be described with reference to FIG. 13. FIG. 13 is a flowchart illustrating a process executed in place of the process illustrated in FIG. 5 according to the first embodiment.

In S1300, the communication application 1010 refers to the set value DB 1050 and sets the DNS server 100 on the network 1 (300) for the OS standard DNS client 1021. For example, if the IP address of the DNS server 100 on the network 1 (300) is "172.24.1.1", the communication application 1010 adds a description, such as "nameserver 172.24.1.1", to "/etc/resolv.conf", and then restarts the OS standard DNS client 1021. If the IP address of the DNS server 110 on the network 2 (310) has been described in "/etc/resolv.conf", the communication application 1010 removes this description.

Then, in S1301, the communication application 1010 waits for a predetermined time period until the OS standard DNS client 1021 is in operation, and then requests the OS standard DNS client 1021 to perform name resolution.

In S1302, the communication application 1010 determines whether name resolution is successful. If the name resolution is successful, the communication application 1010 performs communication based on the IP address obtained as a result of the name resolution, and then the series of operations ends. On the other hand, if the name resolution has failed, the process proceeds to S1303.

In S1303, the communication application 1010 determines whether DNS server settings for another network (the network 2 (310)) are present in the set value DB 1050. If DNS server settings for another network (the network 2 (310)) are present, the process proceeds to S1304. On the other hand, if DNS server settings for another network (the network 2 (310)) are not present, the communication application 1010 notifies the user of an error. Then, the series of operations ends.

In S1304, the communication application 1010 reconfigures the settings of the DNS server to be accessed by the OS standard DNS client 1021.

For example, if the IP address of the DNS server 110 on the network 2 (310) is "192.168.1.1", the communication application 1010 deletes "nameserver 172.24.1.1" from the "conf" file. Further, the communication application 1010 newly describes "nameserver 192.168.1.1", and then restarts the OS standard DNS client 1021. When a predetermined time period elapses after the OS standard DNS client 1021 is restarted, the process proceeds to S1301, and the communication application 1010 performs a name resolution process again. Through the process described above, DNS name resolution in a plurality of networks can be implemented.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may include one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

An embodiment of the present disclosure can provide name resolution using a suitable DNS server for each network interface while utilizing a mechanism (resource) of a typical DNS client. Another embodiment of the present disclosure can improve network connectivity of a communication apparatus having a plurality of interfaces.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-068841, filed Mar. 29, 2019, which is hereby incorporated by reference herein in its entirety.

What is claimed is:

1. A communication apparatus for transmitting data to an external device via a plurality of different communication interfaces, the communication apparatus comprising:
a processor and a memory storing instructions that, when the instructions are executed by the processor, cause the processor to perform operations including:
causing the communication apparatus to operate as a first domain name system (DNS) client configured to query a first DNS server accessible via a first communication interface among the plurality of different communication interfaces to perform name resolution,
causing the communication apparatus to operate as a relay server, and
causing the communication apparatus to operate as a communication application configured to transmit data to a destination identified by a host name,
wherein the relay server includes a second DNS client configured to query a second DNS server accessible via a second communication interface among the plurality of different communication interfaces to perform name resolution,
wherein the communication application (i) requests the first DNS client to resolve the host name when transmitting the data to the destination identified by the host name via the first communication interface, and (ii) transmits the data to the relay server when transmitting the data to the destination identified by the host name via the second communication interface, and
wherein the relay server performs name resolution for the destination identified by the host name by using the second DNS client.

2. A method for controlling a communication apparatus for transmitting data to an external device via a plurality of different communication interfaces, the method comprising:
causing the communication apparatus to operate as a relay server;
requesting, when transmitting data to a destination identified by a host name via a first communication interface among the plurality of different communication interfaces, a first domain name system (DNS) client provided by an operating system of the communication apparatus to perform name resolution, wherein the first DNS client is configured to query a first DNS server accessible via the first communication interface; and
transmitting the data to the relay server when transmitting the data to the destination identified by the host name via a second communication interface among the plurality of different communication interfaces,
wherein the relay server includes a second DNS client configured to query a second DNS server accessible via the second communication interface to perform name resolution, and
wherein name resolution for the destination identified by the host name is performed using the second DNS client in the relay server, and the data received by the relay server is transmitted to the external device by using an Internet Protocol (IP) address obtained as a result of name resolution.

3. The method according to claim 2, wherein the relay server is a relay server configured to function as a proxy server.

4. The method according to claim 2,
wherein the communication apparatus includes a scanner, and
wherein an image obtained by scanning a document using the scanner is transmitted to the external device.

5. The method according to claim 2, further comprising obtaining a list of one or more host names stored in a predetermined area,
wherein, when a communication interface to be used to transmit the data to the destination identified by the host name fails to be determined from among the plurality of different communication interfaces, the first DNS client is requested to resolve the host name or the relay server is caused to relay the data in accordance with whether the host name identified as the destination matches any of the one or more host names in the obtained list.

6. The method according to claim 5, wherein the list is a list of one or more host names to be resolved without using the relay server.

7. The method according to claim 6, further comprising, by the second DNS client in the relay server:
adding the host name to the list in response to a failure to resolve the host name; and
responding with a response that designates the host name as a redirect destination.

* * * * *